United States Patent
Hjelm et al.

(10) Patent No.: US 9,678,527 B2
(45) Date of Patent: Jun. 13, 2017

(54) METHOD AND APPARATUS IN AN ELECTRICITY DISTRIBUTION NETWORK

(75) Inventors: Johan Hjelm, Tokyo (JP); Ioannis Fikouras, Stockholm (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 635 days.

(21) Appl. No.: 14/112,680

(22) PCT Filed: Apr. 20, 2011

(86) PCT No.: PCT/EP2011/056384
§ 371 (c)(1),
(2), (4) Date: Jan. 3, 2014

(87) PCT Pub. No.: WO2012/143051
PCT Pub. Date: Oct. 26, 2012

(65) Prior Publication Data
US 2014/0142767 A1    May 22, 2014

(51) Int. Cl.
G05D 5/00        (2006.01)
G05D 11/00       (2006.01)
(Continued)

(52) U.S. Cl.
CPC .................. *G05F 5/00* (2013.01); *H02J 3/14* (2013.01); *Y02B 70/3225* (2013.01); *Y04S 20/222* (2013.01)

(58) Field of Classification Search
CPC .......... G05F 5/00; H02J 3/14; Y02B 70/3225; Y04S 20/222
(Continued)

(56) References Cited

U.S. PATENT DOCUMENTS

| 8,996,183 B2 * | 3/2015 | Forbes, Jr. ............. G06Q 10/00 700/291 |
| 2003/0047209 A1 * | 3/2003 | Yanai ........................ H02J 3/32 136/244 |

(Continued)

FOREIGN PATENT DOCUMENTS

| EP | 2180571 A2 | 4/2010 |
| FR | 2937473 A1 | 4/2010 |

(Continued)

OTHER PUBLICATIONS

Chertkov et al., "Predicting Failures in Power Grids," submitted to IEEE Transactions of Smart Grids, pp. 1-23, arXiv:1006.0671v1, v.1, Jun. 3, 2010.

*Primary Examiner* — Ziaul Karim
(74) *Attorney, Agent, or Firm* — Rothwell, Figg, Ernst & Manbeck, P.C.

(57) ABSTRACT

There is provided a network element in an electricity distribution network, the network element arranged to: identify a plurality of controllable devices connected to the electricity distribution network; determine the capabilities of the plurality of controllable devices; receive an indication of a target power consumption value; calculate which, if any, of the plurality of controllable devices connected to the electricity distribution network should be activated and which, if any, should be inactivated to meet the target power consumption value; and send instructions towards each controllable device that should be activated and each controllable device that should be inactivated to meet the target power consumption value.

14 Claims, 4 Drawing Sheets

(51) Int. Cl.
*G05D 17/00* (2006.01)
*G05D 23/00* (2006.01)
*G05F 5/00* (2006.01)
*H02J 3/14* (2006.01)

(58) Field of Classification Search
USPC .................................... 700/286–296; 307/20
See application file for complete search history.

(56) References Cited

U.S. PATENT DOCUMENTS

| | | | |
|---|---|---|---|
| 2006/0125421 | A1 | 6/2006 | Costa |
| 2006/0276938 | A1* | 12/2006 | Miller .................... G06Q 50/06 700/295 |
| 2009/0200867 | A1 | 8/2009 | Katz et al. |
| 2010/0207448 | A1* | 8/2010 | Cooper .................... H02J 3/14 307/20 |
| 2010/0312414 | A1* | 12/2010 | Kumar ...................... H02J 3/14 700/295 |
| 2012/0109400 | A1* | 5/2012 | Sundaram ................ H02J 3/14 700/296 |

FOREIGN PATENT DOCUMENTS

| | | |
|---|---|---|
| WO | 2008077654 A1 | 7/2008 |
| WO | 2008125696 A2 | 10/2008 |
| WO | 2009072985 A1 | 6/2009 |
| WO | 2010150059 A1 | 12/2010 |

\* cited by examiner

METHOD AND APPARATUS IN AN ELECTRICITY DISTRIBUTION NETWORK

CROSS REFERENCE TO RELATED APPLICATION(S)

This application is a 35 U.S.C. §371 National Phase Entry Application from PCT/EP2011/056384 filed Apr. 20, 2011, the disclosure of which is incorporated by reference.

TECHNICAL FIELD

The present application relates to a network element in an electricity distribution network, a method of controlling an electricity distribution network, and a computer-readable medium.

BACKGROUND

It is hard, but not impossible, to identify the potential failure points in an electricity distribution network. For example, "Predicting Failures in Power Grids" by Michael Chertkov, Feng Pan, Mikhail G. Stepanov (Available from arXiv.org, Cornell University Library, Report number: LA-UR 10-02934, arXiv:1006.0671v1) describes an approach to predict power grid weak points, and specifically to efficiently identify the most probable failure modes in load distribution for a given electricity network. This approach can be used to identify power grid failure modes (instantons) and can also identify overutilized and underutilized generators, thus providing predictive capability for improving the reliability of an electricity network.

Electrical equipment is usually connected to an electricity distribution network without prior notice to the owner of the electricity network. A meter measures the amount of power used and the user is charged accordingly. Typically such meters were simple analogue counters. However, "smart meters" are becoming increasingly prevalent. A smart meter is a device that is being made available by many electricity providers. As is described by the Electric Power Research Institute (EPRI) and many other electric research organizations, it is expected that other equipment, for instance the inverter controlling the generation and storage equipment in the users premises, will use the smart meter as a communication interface. A smart meter can be a component of a "smart grid", which uses monitoring and communication equipment to help smooth out peak demands in power consumption. In such a smart grid, a smart meter can be used to inactivate certain enabled devices in order to save electricity.

However, the control of the electricity distribution and generation infrastructure is triggered only by changes in the energy flow (voltage, current). Further, while current smart meters allow for some control of electricity consumption in a smart grid, such functionality is limited. Accordingly, there is a need for an improved electricity consumption adaptation scheme in an electricity distribution network.

SUMMARY

Accordingly, there is provided a network element in an electricity distribution network. The network element is arranged to identify a plurality of controllable devices that are connected to the electricity distribution network. The network element is also arranged to determine the capabilities of the plurality of controllable devices. The network element is arranged to receive an indication of a target power consumption value, and to calculate which, if any, of the plurality of controllable devices connected to the electricity distribution network should be activated and which, if any, should be inactivated to meet the target power consumption value. The network element is further arranged to send instructions towards each controllable device that should be activated and each controllable device that should be inactivated to meet the target power consumption value.

The network element may thus determine which devices should be active or inactive to meet a desired power consumption target, and the network element can act to activate and inactivate appropriate devices once such a determination has been made. It should be noted that a desired power consumption target may not only reduce consumption during typical peak demand but also increase consumption during typical low demand.

The network element may be further arranged to calculate a plurality of sequence skeletons comprising which of the plurality of controllable devices connected to the electricity distribution network should be activated and which should be inactivated to meet each of a respective plurality of possible target power consumption values. These skeletons may then be applied upon receipt of a particular target power consumption value, and so may be considered as a precalculated set of the plurality of controllable devices connected to the electricity distribution network which should be activated or inactivated to meet a particular condition encountered by the network.

There is further provided a method of controlling an electricity distribution network. The method comprises identifying a plurality of controllable devices connected to the electricity distribution network. The method further comprises determining the capabilities of the plurality of controllable devices. The method further comprises receiving an indication of a target power consumption value. The method further comprises calculating which, if any, of the plurality of controllable devices connected to the electricity distribution network should be activated and which, if any, should be inactivated to meet the target power consumption value. The method also comprises sending instructions towards each controllable device that should be activated and each controllable device that should be inactivated to meet the target power consumption value.

The method may further comprise calculating a plurality of sequence skeletons, wherein a sequence skeleton defines which of the plurality of controllable devices connected to the electricity distribution network should be activated and which should be inactivated to meet each of a respective plurality of possible target power consumption values.

There is further provided a computer-readable medium, carrying instructions, which, when executed by computer logic, causes said computer logic to carry out any of the methods described above.

In present electricity distribution networks, a user can typically not connect energy-producing equipment to the network without having a permit from the energy company (line or generation owner). As micro-generation becomes more frequent, such functionality will become increasingly desirable. If the user does not have to register in advance (or afterwards) that he has installed customer-premises generation and storage equipment, an automated method is required to discover this. Furthermore, if the user has installed equipment which can be used by the utility provider, e.g. to even out voltage spikes or troughs in the produced energy, or to bridge generating capacity between day and night generating equipment, it is a problem for the utility provider to apply the correct equipment at the right time, so that the most appropriate energy storage or generation equipment gets applied. In addition, if the utility company is aware of this equipment at the user's premises, and can utilize it by remote control, it is appropriate that the user should be compensated for this.

Adding to this, while there are methods to predict failure points as in "Predicting Failures in Power Grids" by Chertkov et al mentioned above, there are no established schemes to remediate these failures automatically and/or predictively.

BRIEF DESCRIPTION OF THE DRAWINGS

A method and apparatus in an electricity distribution network will now be described, by way of example only, with reference to the accompanying drawings, in which.

DETAILED DESCRIPTION

Figure 1:
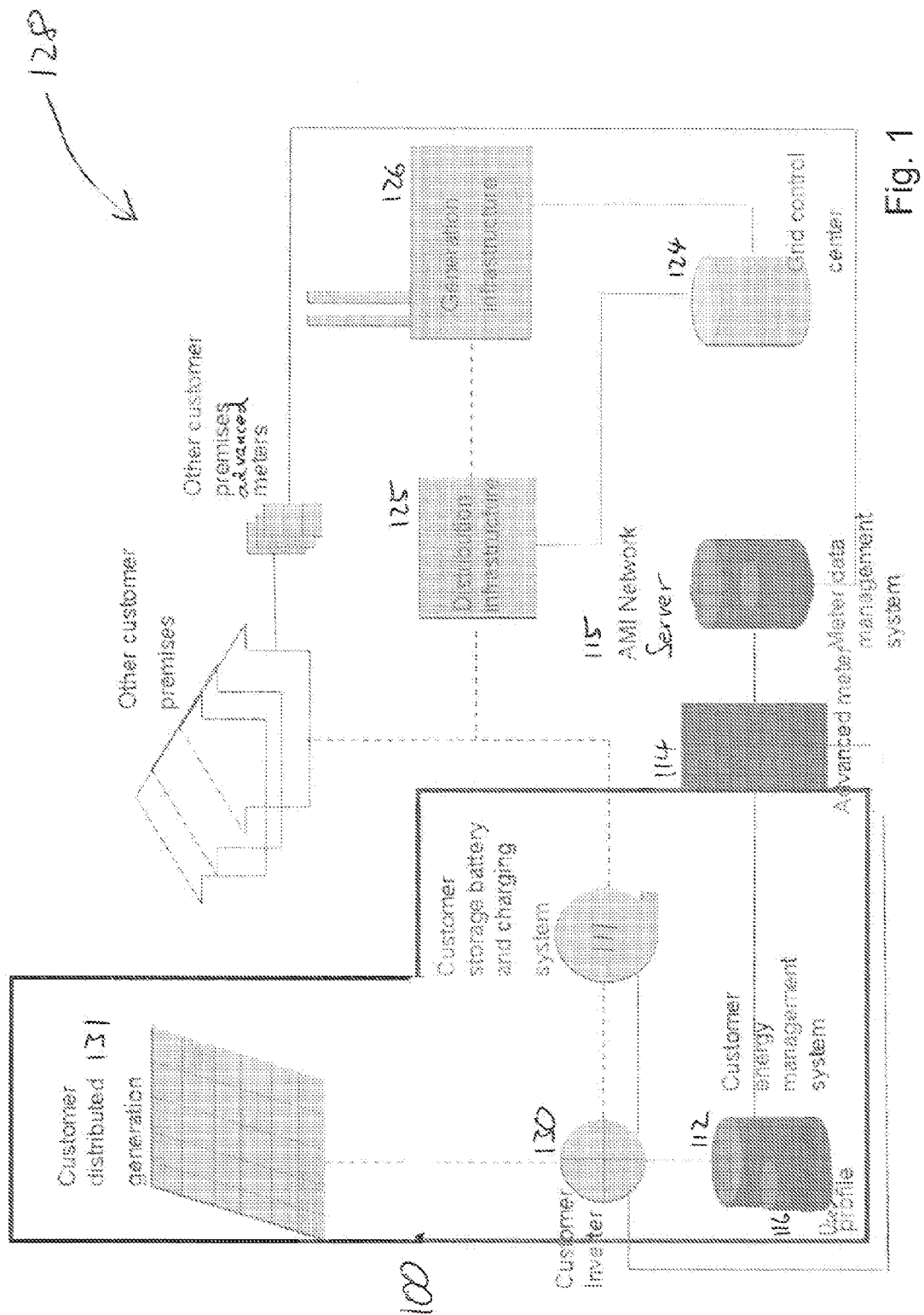
FIG. 1 shows an advanced meter in an electricity distribution network.

A typical deployment of an advanced meter in an electricity distribution network 128 is demonstrated in FIG. 1. This shows the EPRI architecture, but other architectures—both deployed and standardized—are similar. The electricity distribution network 128 according to the EPRI architecture consists of the following components:

Customer Energy Management System 112 (CEMS). This component manages the different types of electrical equipment in the users home. This component contains the user profile information in a user profile database 116.

Advanced Meter 114 (AM). This is an electric meter with communications and management capabilities.

Advanced Metering Infrastructure Network Server 115 (AMI-NS). This component manages the smart meters, and contains a meter data management system which stores the information from the meters.

Generation Infrastructure 126, which increases the entropy of the universe by transforming one form of energy to another, and feeding generated electricity to the Distribution Infrastructure 125.

Distribution Infrastructure 125, including cabling, load balancers, transformers, circuit breakers, etc.

Grid Control Center 124, which controls the distribution infrastructure 125 and the generation infrastructure 126.

Each customer premises connected to the electricity distribution network 128 has an Advanced Meter 114. In FIG. 1, one customer's premises 100 are shown in detail with advanced meter 114 providing a connection between the customer premises 100 and the electricity distribution network 128. The customer premises 100 includes a customer storage battery and charging system 111, a customer distributed generation means 131 (a solar panel array is illustrated) and a customer inverter 130. The customer inverter 130 receives generated DC electricity from sources within the customer premises 100 and converts these to AC electricity for use not only within the customer premises 100 but also for distribution to other customer premises via the electricity distribution network 128. The customer's premises also comprise a customer energy management system 112. The advanced meter 114 sends instructions to the CEMS 112 and the inverter 130. Electricity is distributed within the customer's premises via a local power network known as "mains wiring" or, as is common in the UK, a "ring main". Electrically powered devices in the customer's premises are connected to the local power network, as are the inverter 130, and customer storage battery and charging system 111. The advanced meter 114 connects the local power distribution network to the electricity distribution network 128 external to the customer's premises. The advanced meter 114 meters the amount of electrical power received by the customers premises from the electricity distribution network 128. The advanced meter also measures the amount of electricity delivered back into the network from electricity generation and storage equipment within the customer's premises.

According to an embodiment of the electricity distribution network 128 described herein, there is provided: a discovery service; at least one composition engine; a prediction engine; and a remediation engine. The operation and location of these components is described below.

The Discovery Service is a mechanism to discover newly connected devices, build a profile of the user's equipment, store the capabilities of the equipment in a database, and then apply those whenever required. In particular, the capabilities of the devices that may perform services is stored in at least the user profile 116, but also in a home profile if appropriate. The Discovery Service is deployed as a module in the CEMS 112. A server (the eWURFL) holds a database of capabilities of the electrical equipment to which the discovery service may refer. The database of capabilities may be internet based or may be provided as a module within the AMI Network Server 115.

A Composition Engine is provided to organize the services that may be executed by devices connected to the electricity network. The composition engine organizes the services into sequences and groups, each of which may be referred to as a skeleton. The composition engine parameterizes the skeletons, and orders the execution of them as appropriate. The composition engine referred to herein may be equivalent to the composition engines presented in EP 1978758, WO 2008/119364, WO 2009/141000, WO 2010/017844, the descriptions of which are incorporated herein by reference. The composition engine described herein resides in the AMI-NS 115.

The Prediction Engine and the Remediation Engine are also provided within the AMI-NS 115. The Prediction Engine identifies and uses patterns in the discovered equipment to predict where faults may occur, and learns remediation patterns based on known and implemented remediation strategies. The Remediation Engine monitors the potential fault points, updates the fault surface in real time, and creates service skeletons which are stored in the Composition Engines for possible future use.

It should be noted that at least one of the above described components may alternatively be deployed in the customer energy management system 112 or the advanced meter 114.

Figure 2:
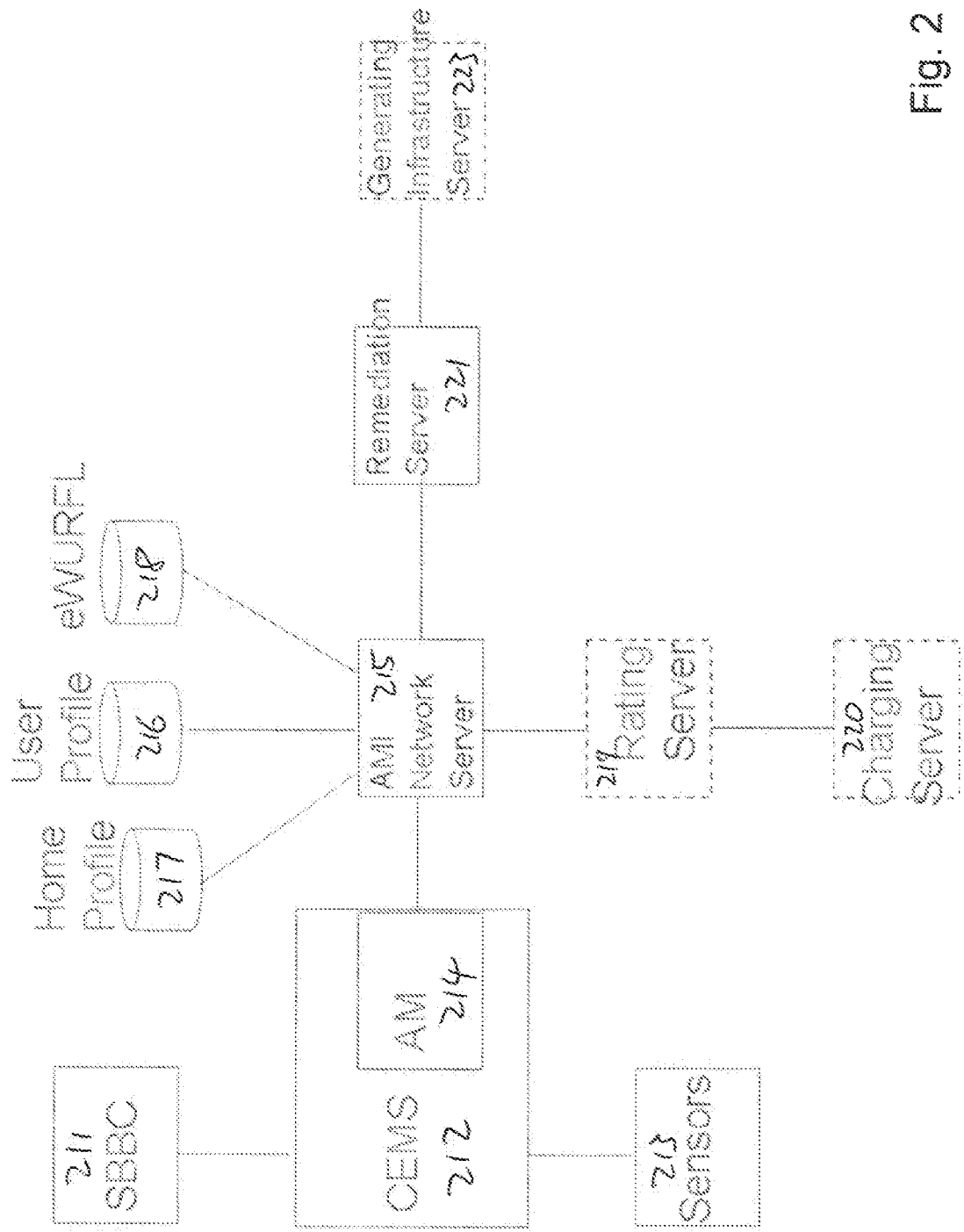
FIG. 2 shows an example of a system incorporating the method and apparatus disclosed herein.

FIG. 2 shows an example of a system incorporating the method and apparatus disclosed herein. A Storage Battery and Battery Controller, SBBC 211 is connected to a Customer Energy Management System, CEMS 212 via the premises electricity and communication network(s). The CEMS 212 receives signals from sensors 213. The CEMS 212 incorporates and Advanced Meter, AM 214 which communicates with an Advanced Metering Infrastructure Network Server, AMI-NS 215. The AMI Network Server 215 has access to a Home Profile database 217, a User Profile database 216 and an eWURFL device capability database 218. SBBC 211 is an example of customer equipment that is connected to the electricity distribution network.

The following functional components are employed to facilitate the operation of the system described herein.

A: Discovery module in the local Customer Energy Management System (CEMS)

B: Control modules in the local Customer Energy Management System. This can be instantiated as a Composition Engine.

C: A device capabilities database (eWurfl)

D: Discovery Module, instantiated in the AMI Network Server.

E: Prediction Engine, which can be instantiated as a skeleton in the Composition Engine.

F: Composition Provisioning Agent

G: Service Composition Skeleton Storage

H: A Profile Server, which provides two separate databases:

Ha: The User Profile

Hb: The Home Profile

Components C-H can be co-located in the AMI Network Server, or in other servers in the core network of the energy control infrastructure. The components D and E can be instantiated using the Composition Engine, which orchestrates the execution of services exposed by the device controllers.

In operation of the system, a user may connect a piece of equipment to the local electricity distribution network in his home. For this example, it is assumed that this equipment is a Storage Battery with a Battery Controller (SBBC) 211. The home is assumed to have two parallel networks, one for electricity distribution and the other for the communication of information. These may be conflated, using technology such as PowerLine networking or similar.

The SBBC 211 is discovered by the Discovery Module of the Customer Energy Management System (CEMS) 212. This discovery can either take place over an information network, i.e. the SBBC 211 broadcasts information about itself and this is picked up by the Discovery Module in the CEMS 212; or it can take place by detecting the changes in the characteristics of the local electricity distribution network. In the latter case, the detection of such a change in characteristics may be used to initiate a request for newly connected devices to register over the information network.

When it discovers the SBBC 211, the CEMS 212 looks up the capabilities of the SBBC 211 in a device capabilities database. Such a database may be implemented using eWURFL, WURFL or similar, presenting the capabilities of the devices in a format that can be used to automatically resolve the capabilities (e.g. an ontology). The database contains capabilities tied to identifiers which may be at least one of either: nominal (name, number), topological (IP address, Ethernet address, and ranges of these), or electrical (derived from the operational characteristics as measured on the network). Accordingly, the only information the SBBC 211 needs to communicate to the CEMS 212 is an identifier which can be used with the database to resolve its characteristics. Communication between the CEMS 212 and the database is via the internet. The information received from the database contains a collection of characteristics and constraints related to the device that may be applicable for later composition tasks. This information is then used to populate the Home Profile 217.

The User Profile 216 allows a user to set further constraints on how devices should be used, and what level of control of each device may be passed to the network. The CEMS control module compares the device capabilities received from the database with the User Profile 216. This ensures that only those capabilities which are approved by the user become available for composition by the network. This can be done using a policy mechanism which applies policies from the profile. Such a policy may be implemented through composition engine methods; in this case this will lead to the definition of constraints related to the profile of the user that can be taken into account by the composition engine.

The CEMS 212 adds context information, i.e. its location, the normal electrical power consumption of the home, other devices available, etc. Context information may also lead to the addition of constraints. The addition of context information is also performed according to the filter received from the User Profile 216.

Optionally, there may be an end-to-end communication between the AMI Network Server 215 and the SBBC 211, for instance through the mediation of the Advanced Meter 214, any constraints that the user may want to impose would then have to be either stored in the eWURFL database 218 or communicated directly to the AMI Network Server 215. The latter can be achieved by the CEMS 212 updating the AM with these constraints, as additions to the characteristics which are retrieved from the eWURFL 218. In that case, constraints received from the AM relating to the particular device must override the generic data from the eWURFL 218.

In the AMI Network Server 215 the data received from the databases 217, 216, 218 is augmented with known topology data, such as whether there are generating substations in the same area, etc. The AMI Network Server 215 can also add globally derived context information, for instance weather forecasts (e.g. "it is cold so more heaters will be used") or seasonal patterns (e.g. "this is Thanksgiving so more people than usual will be using their ovens to roast turkeys"). The AMI Network Server 215 may be implemented as a composite service on the Composition Engine.

The Composition Engine instance in the AMI Network Server 215 is then applied to dynamically adapt to the best possible configuration for servicing the situation which occurs. This implies controlling the demand and response from appliances in a global manner. For instance, the SBBC 211 may be requested to provide electricity during certain hours, whereas a Refrigerator in the customer's premises may be requested to shut off during some hours at peak electric consumption, during hours when it is not usually opened.

Determining the devices to be controlled is done by checking two databases: The Home Profile 217, to see which devices are available in the home; and the User Profile 216, which provides information about the constraints which apply to the use of these devices. The CEMS 212 may also be implemented using Composition Engine methods. The CEMS controls the Inverter in the home, which means that it services the requests from the AMI Network Server 214 according to threshold values set in the User Profile. Accordingly, the CEMS 214 may determine that the SBBC should provide electricity for the home before selling electricity to the network (i.e. only excess electricity will be sold). In such cases, there can be an optimization of the distribution of skeletons as will be described below.

The CEMS 214 is implemented inside an application layer home gateway, for instance a home gateway, e.g. using OSGi or similar standardized execution environment methods. The CEMS 214 may be implemented either together with or separately from the advanced metering infrastructure. In one embodiment, the CEMS 214 is implemented using the Ericsson Composition Engine, and this can be pre-provisioned with service skeletons that are applied when conditions occur that would require service composition. Such a condition may comprise a node of the distribution infrastructure approaching maximum capacity. The service compositions are triggered based on predetermined event mechanisms.

FIG. 2 also shows a remediation server 221 and a generating infrastructure server 223. The remediation server 221 is used to anticipate potential failures in the distribution infrastructure and take action to avoid network failures. The generating infrastructure server 223 communicates with the generating infrastructure, requesting additional or reduced power generation in response to changes in demand, or to changes in the output of a subset of power generation facilities.

AMI Network Sever 215 communicates with a rating server 219 and a charging server 220. The charging server 220 receives electricity consumption data from the Advanced Meter 214 and converts this to charges for billing the customer. The charging server 220 also receives data relating to the quantity of electricity put back into the electricity distribution network 128 by the consumer generation 131 and storage 111 equipment, and uses this information to calculate how much money is owed to the customer. Furthermore, the rating server 219 may be used to provide values per unit of electricity used by the consumer premises, or sold back to the electricity distribution network by the consumer premises. These prices may vary with time of day, dependent upon the demand for electricity from premises connected to the electricity distribution network.

Figure 3:
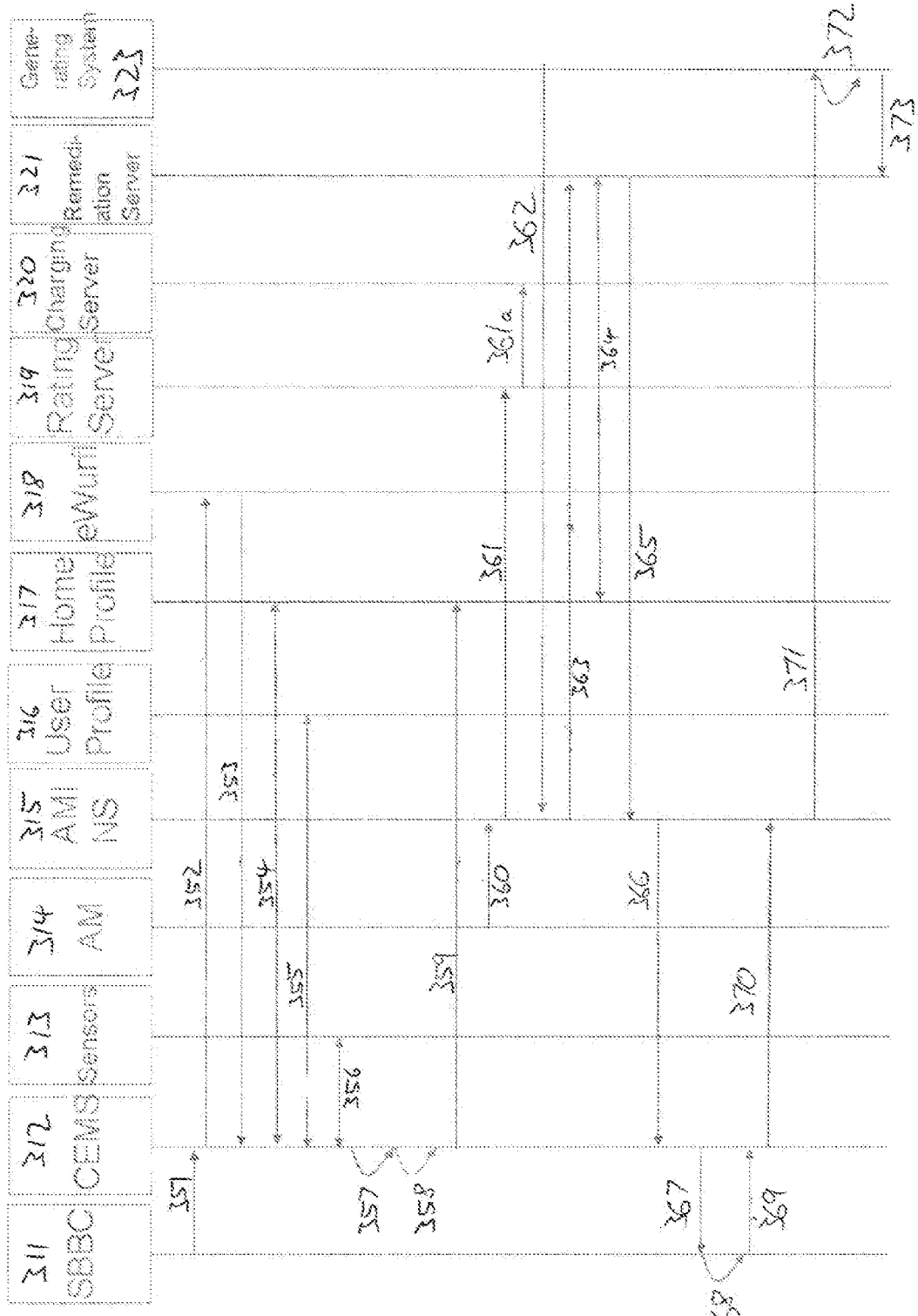
FIG. 3 is a messaging diagram showing example interactions between the components described herein.

FIG. 3 is a messaging diagram showing example interactions between the components described above. In particular, FIG. 3 shows interactions between: a storage battery and battery controller (SBBS) 311 based in a customer premises; a consumer energy management system (CEMS) 312; sensors 313; an advanced meter (AM) 314; an advanced meter network server (AM-NS) 315; a user profile database 316; a home profile database 317; an eWURFL device capability database 318; a rating server 319; a charging server 320; a remediation server 321; and a generating system 323.

An SBBC 311 is connected to the local electricity distribution network of a customer's premises. At 351 the SBBC 311 is discovered by a discovery module in the CEMS 312. The discovery can be done over the information network, if the SBBC 311 has a data network connection; or over the electrical network, by sensing the different load on the network. When measured over the electrical network, the characteristics of the newly connected entity as it consumes or produces electricity are measured by the CEMS 312 and used to determine a fingerprint or pattern for the entity. At 352 the CEMS 312 sends the derived pattern or received address to the eWURFL database 318 for lookup. The derived pattern can include the electric signature of the device. If a new device is connected, it can be identified by subtracting the new instance of the electric fingerprint of the house from a previous instance, hence creating a derived fingerprint for the device. The readings from the sensors 313 in the home can also be applied to assist in the derivation of the pattern (not illustrated in FIG. 3).

At 353 the eWURFL database 318 returns a description in ontology format of the appliance 311. This includes a number of parameters, including the effects of activation and/or inactivation and whether it is suitable for demand-response management. At 354, the CEMS 312 checks the Home Profile 317 for other registered connected devices. At 355, the CEMS 312 checks the User Profile 316 for filters. At 356, the CEMS 312 checks its attached sensors 313 for context information. At 357 the CEMS applies the received filters to the Home Profile information, removing items which should not be presented for privacy reasons, and then at 358 the CEMS 312 generates a Home Profile 317 which is to be presented to the AMI Network Server 315. Then, at 359 the CEMS 312 updates the Home Profile database 317.

At 360, the advanced meter 314 (which is part of the EMS 312) reports the aggregated electricity consumption for the home to the AMI Network Server 315. The AMI Network Server 315 forwards the received electricity consumption to the Rating Server 319 at 361. This initiates the Charging Function at 361a, which is used to bill the user via charging server 320. The functions of the AMI Network Server 315 can be realized as composition engine skeletons. This means that the AMI Network Server 315 operates as a composition engine (which may be an instance of the Ericsson Composition Engine).

At 362 the AMI Network Server 315 receives an alert from the Generating System 323 that the demand (current or projected) is approaching the available generation capacity (current or projected). This process can involve a prediction created and provided by a Prediction Server.

At 363, the AMI Network Server 315 requests a remediation pattern suggestion from the Remediation Server 321. At 364, the Remediation Server 321 checks the Home Profile(s) 317 of those connected homes which have opted in for demand-response control. This includes checking the type of equipment which can be remotely controlled. The Home profile 317 also includes the history of the homes. This is used to set a fair rate of control, i.e. the same households should not have their refrigerators turned off every day. The effect for controlling different types of equipment is calculated by the AMI Network Server 315. The optimal combination(s) of devices to be activated and inactivated is determined. This process can be done in advance, and stored as a skeleton pattern for later deployment.

At 365 the Remediation Server 321 sends a proposed pattern of activation (or de-activation, as the case may be) of equipment which would have the desired effect, to the AMI NS 315. For instance, a refrigerator being switched off for 2 hours is inactivated, while a SBBC 311 being switched on to deliver 1 kWH of electricity to the network is activated. In practice, this is done by the AMI NS 315 alerting the CEMS 312 and sending 366 it the commands; the CEMS 312 then sends 367 activation and inactivation commands to the appropriate devices through the customer premises data distribution network. At 368 the appropriate equipment is activated or inactivated.

At 369, the activation or inactivation of the equipment is confirmed, either by signaling from the equipment directly, or by measuring the change in (produced/consumed) effect from the home (i.e. passing through the advanced meter 314).

At 370, the CEMS 312 confirms the activation or inactivation of the devices to the AMI NS 315. In case an activation or inactivation can not be performed, the AMI Network Server 315 can select a different home or equipment in the same home to be inactivated.

In an alternative embodiment, device control can be distributed to the home such that the CEMS 312 simply receives a command to make a net reduction of 10 kWh power consumption. The actual process of doing so is not regulated in detail, and so the CEMS 312 may elect whether to activate 10 kWh of electricity generation or storage release, or inactivate 10 kWh of consuming devices. To do this, the CEMS 312 activates a skeleton of commands which had been previously stored, for instance through a provisioning process.

At 371, confirmation of the device activations/inactivations are sent to the Generating System 323. At 372, the Generating System 323 determines if the load was decreased sufficiently to maintain the current generation capacity, or whether to request further decreases or to demand more generation capacity. At 373, the Generating System 323 requests the Remediation Server 321 for further recommendations. This also has to be based on forecasts of the ambient conditions, e.g. weather. In the case that there is no need to take any further action, the Remediation Server 321 recommends this to the Generating System. In case further actions are needed, the steps 362 to 372 are looped until step 373 returns a null and the system is in equilibrium. The Remediation Server 321 may include a machine learning system, learning by the process of repeated requests and responses what will be appropriate for the future.

Figure 4:
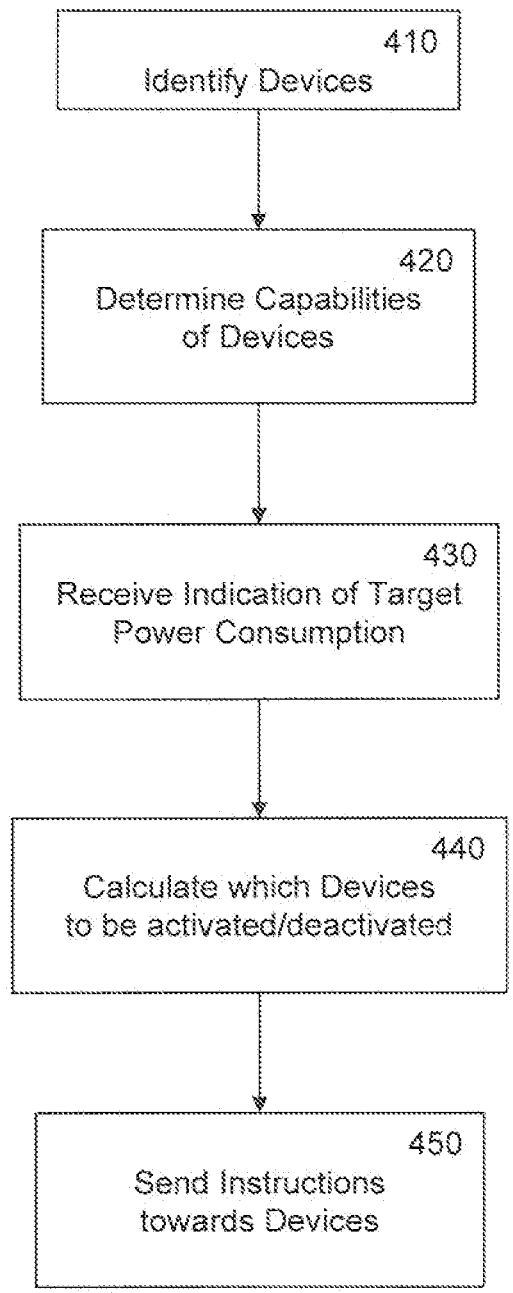
FIG. 4 shows a flow diagram of a method disclosed herein.

FIG. 4 shows a flow diagram of a method disclosed herein. The method is performed within a network element of the electricity distribution network shown in FIG. 1. The method may be performed in the AMI network server 115, the advanced meter 114, or the customer energy management system 112. At 410, devices connected to the network are identified. This may be performed by detecting a change in electrical characteristics of a local distribution network, or by direct communication over a local data network. At 420, the capability of the identified devices is determined. This may be done by determining an identity of the device and looking up the device capabilities in a database. At 430, the network element receives an indication of target power consumption. The target power consumption may be received from a distribution infrastructure 125 or a grid control centre 124. At 440, the network element calculates which devices connected to the power distribution network should be activated or inactivated to meet the target power consumption. At 450, instructions are sent towards the devices which it has been determined should be activated and those which it has been determined to be in activated.

The Composition Engine can be used to call a service (for instance in the "cloud" or at a dedicated computation site) which receives the measurement data from the AMI Network Server 315, and determines whether a fault is imminent, depending on modeling of the current situation. The general mechanisms for this service are defined in a skeleton. Such a skeleton may also be applied if there are several interlinked composition engines which cooperate in running the services of the system. A skeleton may be defined as a service template or a set of rules which define a collection of services. The skeleton may be thought of as a template comprising instructions or rules for the activation or inactivation of a plurality of devices. The skeleton may identify individual devices or may identify categories of device.

The skeletons for these operations can be proactively computed, as the types of equipment, their potential combinations, and the effect to be avoided or delivered is known. While the number of potential combinations of activated devices connected to the network is high, it is not infinite, and some types of combinations are more likely to occur than others. Further, it may be noted that in some countries, new homes are equipped with electrical equipment produced by one manufacturer, sometimes even to the extent of their owning the maker of the house, for instance—so a Pana-home in Japan is more likely to have Panasonic equipment than other types.

The proactive computation of skeletons can be performed in a separate recommender node, the Skeleton Closet, which computes the effect of instantiating various command sequence skeletons and their effects. This is done in a statistically aggregated manner, not for the individual instances, i.e. the effect is computed for the complete set of controllable homes, not for the individual home. A separate optimization function can be made to operate in the individual home, as an additional module for the CEMS.

The optimization of the skeletons can be done either on the basis of the operational capacity of the energy provider; on the distribution capacity; on the decrease of $CO_2$ (the most favorable energy sources are always selected), or some other major constraint. The skeletons can be broken down into modules defined by translations of the specification into an ontology or similar, which makes it possible to compose the profile from the ontologies representing the specifications. Only this composition skeleton or template may be stored in the database.

The skeletons are used as a template to determine which devices to activate and which to inactivate to fulfill an appropriate requirement of the electricity network, such as avoiding electricity consumption spikes.

The skeletons may also be used for the prediction of failure points and remediation. In this way it is possible to proactively handle potential network faults ("instantons"). This requires no difference in the function of the core components, but does require that the Composition Engine is provisioned with, or has created, appropriate skeletons for implementing in the event of the emergence of an instanton, or even proactively implementing at signs of pre-emergence of an instanton.

Augmented data is stored in a User Profile in the AMI Network Server. This is used by the Prediction Engine to predict the failure points in the network, and their most expedient remediation. The analysis of the failure points is performed based on patterns discovered in the database of components available in the home (the Home Profile).

Another use of service skeletons is in the field of inter-operator clearance for inter-network energy transactions. Where strict controls on the release of $CO_2$ and other greenhouse gases into the atmosphere apply, there is a disincentive to use electricity generation methods which generate electricity by releasing such gasses. In such a situation, an operator of electricity generation and distribution systems would like to avoid activating this type of generation equipment. Further, if a neighboring operator can decrease their consumption of energy sufficiently to deliver the missing amount of energy into the network of the first operator, especially if this is done to bridge a temporary gap in production (such as air conditioning during the hottest hour of the day only), then the second operator is likely to be willing to resell the capacity saved to the first operator, especially if this can be done at a premium price.

In a system where there are a plurality of neighboring electricity network operators, or distributors of electricity, this scenario may be complicated by the fact that the network operators do not own the generating capacity. They have to buy the electricity from the generator, which may require signing up for large chunks of energy which they may not consume completely other than during maximum loads. The system described here can be applied between electricity distributors and generators, as well as homes. The composed skeletons can be aggregated at different levels, generating higher-level composed skeletons which can be compared automatically to enable the selection of the most suitable skeleton.

If these skeletons are presented in an aggregated format for the selection by other distributors, generators, or similar, this aggregated format can be used for simultaneous selection and reservation of skeletons by the actors. This can be combined with rounds of modifications of the offers and the appropriate compensations for them, for instance using a turn-taking mechanism or some form of auction.

The system described in this document enables the use of pre-composed command skeletons to quickly effect savings or additional electricity supplies in a system of connected electrical devices, such that the savings or gains for the individual user and the electricity distribution network operator are optimized.

It will be apparent to the skilled person that the exact order and content of the actions carried out in the method described herein may be altered according to the requirements of a particular set of execution parameters. Accordingly, the order in which actions are described and/or claimed is not to be construed as a strict limitation on order in which actions are to be performed.

Further, while examples have been given in the context of particular electricity distribution network, these examples are not intended to be the limit of the electricity distribution networks to which the disclosed method and apparatus may be applied. For example, while specific examples have been given in the context of the EPRI network structure, the principles disclosed herein can be applied to any electricity distribution network which uses advanced meters or smart meters.

The invention claimed is:

1. A network element in an electricity distribution network, the network element comprising a memory and one or more processors connected to the memory, wherein the one or more processors are arranged to:
    create a plurality of sequence skeletons including a first sequence skeleton and a second sequence skeleton, wherein
        A) the first sequence skeleton identifies one or more of: i) a first set of one or more controllable devices that should be activated, ii) a first set of one or more controllable devices that should be inactivated, iii) a first set of one or more controllable device categories for identifying one more controllable devices that should be activated, and iv) a first set of one or more controllable device categories for identifying one more controllable devices that should be activated and
        B) the second sequence skeleton identifies one or more of: i) a second set of one or more controllable devices that should be activated, ii) a second set of one or more controllable devices that should be inactivated, iii) a second set of one or more controllable device categories for identifying one more controllable devices that should be activated, and iv) a second set of one or more controllable device categories for identifying one more controllable devices that should be activated;
    associate the first sequence skeleton with a first power consumption value;
    associate the second sequence skeleton with a second power consumption value;
    identify a plurality of controllable devices connected to the electricity distribution network;
    determine one or more capabilities of the plurality of controllable devices;
    receive an indication of a target power consumption value;
    compare the received target consumption value with the first power consumption value;
    compare the received target consumption value with the second power consumption value when the target power consumption value does not match the first power consumption value;
    select the second sequence skeleton when the target power consumption value matches the second power consumption value; and
    send instructions towards each controllable device identified by the selected sequence skeleton to meet the target power consumption value, wherein
    the one or more processors arranged to calculate a plurality of sequence skeletons comprising which of the plurality of controllable devices connected to the electricity distribution network should be activated and which should be inactivated to meet each of a respective plurality of target power consumption values, wherein each of the plurality of target power consumption values identifies a different target power consumption.

2. The network element according to claim 1, wherein the network element is further arranged to send instructions direct to controllable devices.

3. The network element according to claim 1, wherein the network element is further arranged to sends instructions to at least one advanced meter.

4. The network element according to claim 1, wherein the network element is further arranged to calculate an order of activation and inactivation of the controllable devices.

5. The network element according to claim 1, wherein a sequence skeleton is calculated for responding to at least one of:
    a failure of an element in the generation infrastructure giving a reduction in electricity generating capacity;
    an increase in consumption of electricity from the electricity distribution network; and
    a failure of a node of the distribution infrastructure.

6. The network element according to claim 1 wherein at least one of the controllable devices is an electricity storage device.

7. A computer implemented method of controlling an electricity distribution network, the method being performed by a computer and comprising:
    creating a plurality of sequence skeletons including a first sequence skeleton and a second sequence skeleton, wherein
        A) the first sequence skeleton identifies one or more of: i) a first set of one or more controllable devices that should be activated, ii) a first set of one or more controllable devices that should be inactivated, iii) a first set of one or more controllable device categories for identifying one more controllable devices that should be activated, and iv) a first set of one or more controllable device categories for identifying one more controllable devices that should be activated and
        B) the second sequence skeleton identifies one or more of: i) a second set of one or more controllable devices that should be activated, ii) a second set of one or more controllable devices that should be inactivated, iii) a second set of one or more controllable device categories for identifying one more controllable devices that should be activated, and iv) a second set of one or more controllable device categories for identifying one more controllable devices that should be activated;

associating the first sequence skeleton with a first power consumption value;

associating the second sequence skeleton with a second power consumption value;

identifying a plurality of controllable devices connected to the electricity distribution network;

determining one or more capabilities of the plurality of controllable devices;

receiving an indication of a target power consumption value;

comparing the received target consumption value with the first power consumption value;

comparing the received target consumption value with the second power consumption value when the target power consumption value does not match the first power consumption value;

selecting the second sequence skeleton when the target power consumption value matches the second power consumption value;

sending instructions towards each controllable device identified by the selected sequence skeleton to meet the target power consumption value; and calculating a plurality of sequence skeletons, wherein a sequence skeleton defines which of the plurality of controllable devices connected to the electricity distribution network should be activated and which should be inactivated to meet each of a respective plurality of possible target power consumption values.

8. The method of claim 7, further comprising receiving an alert indicating that a power consumption threshold within an area has been reached, wherein the identifying and determining steps are performed as a direct result of receiving the alert.

9. The method of claim 7, wherein the sending of instructions towards each controllable device comprises sending instructions to at least one advanced meter.

10. The method of claim 7, further comprising calculating an order of activation and inactivation of the controllable devices.

11. The method of claim 7, wherein a sequence skeleton is calculated for responding to at least one of:
a failure of an element in the generation infrastructure giving a reduction in electricity generating capacity;
an increase in consumption of electricity from the electricity distribution network; and
a failure of a node of the distribution infrastructure.

12. The method according to claim 7, wherein at least one of the controllable devices is an electricity storage device.

13. The method of claim 7, wherein sending instructions towards each controllable device that should be activated and each controllable device that should be inactivated comprises:
transmitting a command to a selected one of the plurality of controllable devices that should be activated, wherein said selected controllable device is located within a first customer's premises, and said command configures the selected controllable device to provide electricity to the electricity distribution network for use by devices within a second customer's premises that is different than the first customer premise.

14. A computer program product comprising one or more non-transitory computer-readable mediums storing instructions for:

creating a plurality of sequence skeletons including a first sequence skeleton and a second sequence skeleton, wherein A) the first sequence skeleton identifies one or more of:
i) a first set of one or more controllable devices that should be activated, ii) a first set of one or more controllable devices that should be inactivated, iii) a first set of one or more controllable device categories for identifying one more controllable devices that should be activated, and iv) a first set of one or more controllable device categories for identifying one more controllable devices that should be activated and B) the second sequence skeleton identifies one or more of: i) a second set of one or more controllable devices that should be activated, ii) a second set of one or more controllable devices that should be inactivated, iii) a second set of one or more controllable device categories for identifying one more controllable devices that should be activated, and iv) a second set of one or more controllable device categories for identifying one more controllable devices that should be activated;

associating the first sequence skeleton with a first power consumption value;

associating the second sequence skeleton with a second power consumption value;

identifying a plurality of controllable devices connected to the electricity distribution network;

determining one or more capabilities of the plurality of controllable devices;

receiving an indication of a target power consumption value;

comparing the received target consumption value with the first power consumption value;

comparing the received target consumption value with the second power consumption value when the target power consumption value does not match the first power consumption value;

selecting the second sequence skeleton when the target power consumption value matches the second power consumption value;

sending instructions towards each controllable device identified by the selected sequence skeleton to meet the target power consumption value; and calculating a plurality of sequence skeletons, wherein a sequence skeleton defines which of the plurality of controllable devices connected to the electricity distribution network should be activated and which should be inactivated to meet each of a respective plurality of possible target power consumption values.

\* \* \* \* \*